United States Patent Office 2,950,285
Patented Aug. 23, 1960

2,950,285

COLORING MATTER FOR BALL-PEN INKS

Calvin Quentin Miller, Newark, Del., and William Wade Ranson, Woodstown, N.J., assignors to E. I. du Pont de Nemours and Company, Wilmington, Del., a corporation of Delaware No Drawing. Filed June 30, 1958, Ser. No. 745,251

2 Claims. (Cl. 260—314.5)

This invention relates to dye salts obtained by reacting Victoria Pure Blue BO with metal or metal-free phthalocyanine sulfonates, and with solutions of such dye salts in glycolic solvents.

It is an object of this invention to produce compositions of matter adapted for use as coloring matter for ball-pen inks. Other objects and achievements of this invention will become apparent as the description proceeds.

As is well known, ball pens, that is pens employing a revolving ball as pen point, usually employ as ink supply a cartridge containing the ink in solution or in a creamy or semipasty state, which yields to pressure and becomes sufficiently fluid in the vicinity of the writing ball to produce a legible trace on the writing surface. Such inks must possess very special physical properties for proper functioning. For instance, in the case of solutions, the ink must be stable against crystallization or caking when held for a long time in the ink barrel; it must be non-corrosive to the material of the barrel; it must be capable of flowing from the barrel of the pen in a continuous, even though fine, stream, so as to produce continuous lines and characters upon the written surface.

As a result of such drastic demands, the industry has essentially settled upon the use of glycols as the liquid vehicle for ball-pen inks of the solution type. More customarily, liquid alkanediols are employed such as ethylene glycol, propylene glycol, 2-methyl-2,4-pentanediol, and other similar compounds having from 2 to 8 C-atoms. However, monoalkyl ethers of glycols are also suitable, for instance the lower monoalkyl ethers (1 to 4 C-atoms) of diethylene glycol (known in trade as "Carbitols").

There remains now the problem of selecting the proper coloring matter for the ink. To be suitable for the purpose stated, the coloring matter itself must satisfy several important demands. First of all, it must have satisfactory light fastness, so that a record made with the resulting ink, shall not fade away if left exposed for a long stretch of time. Secondly, it must be capable of being incorporated into the ink to a very high concentration, so that it will produce a strong, legible writing. Thirdly, it should be free of grit; fourthly, the writing produced by the ink shall not spread out, bleed or diffuse through the paper into a feathered pattern, preferably even if the paper is damp. Fifthly, the ink thus produced must fall within certain, hitherto determined limits of viscosity, so as not to flow too freely nor hold back in the course of writing. Various other practical requirements can be enumerated, but for the present purpose the above will do.

The first requirement above has heretofore often been satisfied by employing a pigment as part of the coloring matter, particularly a phospho-tungstic or phospho-tungsto-molybdic salt of a basic dye. Such pigment being insoluble in glycolic solvents, the second requirement was then satisfied by suspending the coloring matter in finely divided but solid state in the glycolic vehicle.

Such a solution to the problem is not however entirely satisfactory, because the employment of solid suspensions results in writings which are not fast to crocking (i.e. they rub off easily when dried). Furthermore, the viscosity of such inks is difficult to control, and caking at the ball point of the pen often interferes with the free flow of the ink.

We have now found that ball-pen ink compositions of excellent qualities, particularly from the viewpoint of strength, light fastness, crocking fastness and freedom from caking or polymerization troubles are obtained by incorporating into glycolic solvents a dye salt obtained by interacting solutions of Victoria Pure Blue BO and of metal or metal-free phthalocyanine polysulfonates which possess on the average from 2 to 4 sulfo groups per molecule.

Victoria Pure Blue BO has been defined in U.S. Patent No. 2,422,445 as a salt (essentially the hydrochloride) of tetraethyldiamino - diphenyl - alpha - monoethylamino-naphthyl methane. In A.C.S. Monograph No. 127 (The Chemistry of Synthetic Dyes and Pigments, edited by H. A. Lubs), at page 286, this compound is formulated as a salt comprising the cationic radical of tetraethyldiamino-diphenyl-alpha - ethylaminonaphthyl methane associated with a chloride ion, thus:

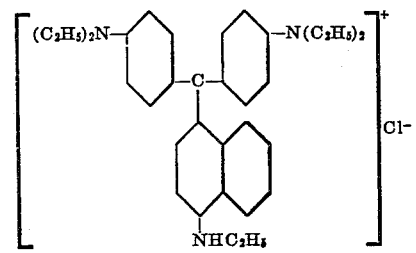

Sulfonated metal and metal-free phthalocyanines are well known in the art. See for instance, U.S.P. 2,099,689. For the purpose of this invention, we prefer a polysulfonate of any of the following phthalocyanine compounds: copper, nickel or cobalt phthalocyanine; any of the aforementioned phthalocyanines containing a halogen of the group consisting of chlorine and bromine to an extent of not more than 1 halogen atom, on the average, per molecule; copper-tetraamino phthalocyanine; and metal-free phthalocyanine. Its sulfo content may be any number (integral or fractional) between 2 and 4, on the average, per molecule. Since we are using an aqueous solution thereof, this sulfonated compound should preferably be in the form of a water-soluble salt. Common salts satisfying this requirement are the sodium, potassium and ammonium salts; but other cations may also be used, for instance mono-, di- or triethanolammonium.

The salts obtained by us in this invention may therefore be defined by the formula $$Q(SO_3Vi)_x$$

wherein Q stands for the radical of a phthalocyanine polysulfonate from the group above set forth, Vi designates the cationic radical of tetraethyldiaminodiphenyl-alpha-ethyl-aminonaphthyl methane, while $x$ is an average number having a value from 2 to 4.

The reaction may be achieved by simply mixing an aqueous solution of the phthalocyanine color with an aqueous, alcoholic or aqueous alcoholic solution of the basic color. Methanol, ethanol or isopropanol are convenient alcohols for this purpose. The reaction mass may be heated at temperatures up to the boiling point of the mixture.

If the reaction is carried out at temperatures not higher than 70° C., the dye salt separates out in the form of a filterable, granular precipitate. If the reaction temperature is between 80° and 100° C., a molten or tarry precipitate is formed, which may be recovered by decantation and drying cautiously to give a brittle, dry solid.

Regardless of the mode of preparation, however, we find the product ideally suitable for the preparation of ball-pen inks. The dye-salt dissolves readily in glycolic solvents to concentrations of 50% by weight or higher. With copper phthalocyanine polysulfonate, concentrations as high as 58% by weight may be obtained in 2-methyl-2,4-pentanediol. The solutions thus obtained have viscosities of between 5000 and 15,000 centipoises, which is the viscosity generally required by the ball-pen industry. The writings made by such ink are light fast and fast to rubbing. But a particularly distinguishing characteristic of our novel ink is the complete lack of water-bleed on paper. This is a much desired property in ball-pen inks, and one which is lacking in inks of the alcoholic solvent type.

Without limiting our invention, the following examples are given to illustrate our preferred mode of operation. Parts mentioned are by weight.

Example 1

Two aqueous solutions were prepared at 70° C., one a 6% solution containing 90 parts of copper phthalocyanine polyammonium sulfonate (2.7 $SO_3NH_4$ groups per molecule) and the other, a 4% solution containing 200 parts of Victoria Pure Blue BO (U.S.P. 2,422,445 and Lubs, A.C.S. Monograph No. 127, page 286). The 4% solution was stirred into the 6% solution. The granular precipitate which formed was filtered off at 70° C., washed with water until the filtrate was essentially colorless, then dried at 55° C., ground and passed through an 80-mesh sieve.

Example 2

A 6% aqueous solution at 80° C. containing 98 parts of the ammonium salt described in Example 1 was stirred into an 80° C. solution of 150 parts of Victoria Pure Blue BO in 300 parts of 2B alcohol (95% ethanol containing 0.5% benzene). The dye salt which formed came out of solution as a tar which was removed and dried at 70° C. in a vacuum oven. The dried product was ground and passed through an 80-mesh sieve.

Example 3—Miscellaneous other phthalocyanines

A 6% aqueous solution by weight of each of the phthalocyanine sulfonic acids indicated in the following table was prepared at 80° C. at a pH of 7.5, adjusted with ammonium hydroxide, and the hot solution was clarified by filtration. 70 to 100 parts of a 45% ethyl alcohol solution of Victoria Pure Blue BO at 70° C. were added to 425 parts of said aqueous solution at 80° C.

Formation of the water-insoluble salt of the two dyes was completed rapidly as shown by spot tests on wet filter paper. (An excess of either dye ingredient becomes clearly visible by its characteristic color bleed into the wet portion of the paper.) The addition of basic dye solution was then discontinued, and the alcohol was boiled off. The aqueous residue was cooled and the mother liquor was decanted. The dye salt, which remained as a viscous tar, was dried in vacuum at 75° C. and ground through an 80-mesh sieve.

The dye salts obtained were strong, bright blue ink colors comparable in properties to the color described above in Example 2, and soluble in 2-methyl-2,4-pentanediol to a concentration of at least 50% by weight in each instance.

The phthalocyanine sulfonates thus tested were the following:

A. Copper phthalocyanine tetra-$SO_3K$
B. Copper tetraamino phthalocyanine tetra-$SO_3H$
C. Metal-free phthalocyanine tri-$SO_3Na$
D. Nickel phthalocyanine tetra-$SO_3Na$
E. Copper phthalocyanine containing an average of 0.7 chlorine atom and 3.3 $SO_3Na$ groups per molecule
F. Copper phthalocyanine containing an average of 0.25 bromine atom and 2 $SO_3H$ groups per molecule
G. Cobalt phthalocyanine di-$SO_3H$
H. Cobalt phthalocyanine di-$SO_3H$ containing an average of 0.4 chlorine atom per molecule.

While the above phthalocyanine polysulfonates are mostly known compounds, the following paragraphs indicate briefly their mode of preparation.

A. The potassium salt of 4-sulfophthalic anhydride is reacted in the conventional "urea process," using trichlorobenzene as solvent, and in the presence of cupric chloride and ammonium molybdate. The dried product is purified by dissolving in aqueous KOH following by salting from 5% aqueous KCl.

B. Copper tetraamino phthalocyanine (1 part) is sulfonated in 10 parts of 20% oleum for 8 hours at 70° C. The mass is drowned in ice and salt water (5% NaCl) and then filtered. The filter cake is washed nearly acid free with 5% NaCl solution.

C. One part of metal-free phthalocyanine is heated for 2 hours at 75°–80° C. in 9 parts of 40% oleum. The mass is cooled, drowned in a mixture of ice and salt water, and filtered. The filter cake is washed acid free using 20% NaCl solution.

D. One part of nickel phthalocyanine is dissolved in 6.3 parts of 24% oleum and agitated at 85°–90° C. for 5 hours. The hot sulfonation mass is drowned into 42 parts of 10% NaCl solution, filtered and the filter cake is washed acid free using 10% NaCl solution.

E. One part of a mixture containing 70% copper monochlorophthalocyanine (prepared from $Cu_2Cl_2$ and phthalonitrile) and 30% copper phthalocyanine is dissolved in 5.3 parts of 17% oleum and then agitated at 85°–90° C. for 8 hours. The hot sulfonation mass is drowned into 40 parts of 10% NaCl solution, filtered and the filter cake is washed acid free using 10% NaCl solution.

F. One part of a mixture containing 75% copper phthalocyanine and 25% copper monobromophthalocyanine (prepared from $Cu_2Br_2$ and phthalonitrile) is dissolved in 4.5 parts of 7.8% oleum and then agitated at 120°–125° C. for 3.5 hours. The hot sulfonation mass is drowned into 38 parts of 10% NaCl solution, filtered and washed with 10% NaCl solution to reduce the acidity of the filter cake.

G. One part of cobalt phthalocyanine is sulfonated according to the process described in paragraph "F" except that the heating period is preferably 4 hours.

H. One part of a mixture consisting of 60% cobalt phthalocyanine and 40% cobalt monochlorophthalocyanine (prepared from a mixture of 16 mole-% 4-chlorophthalic acid and 84 mole-% phthalic anhydride, $CoCl_2$, urea, ammonium molybdate, and kerosene as diluent is sulfonated by the process described in paragraph "G."

Example 4—Preparation of ink 5 parts of the dried and screened dye salt prepared according to Example 1 were dissolved in 5 parts of 2-methyl-2,4-pentanediol at 80° C. and the ink solution thus obtained was allowed to cool to room temperature. Standard ball-pen ink cartridges were filled with this ink and tested in ball-point pens. They were found to produce smooth and continuous written characters, which were particularly free of water-bleed (i.e. showed no feathering on the edges when written on damp paper), and were fast to light (over 100 hours in the fadeometer).

The products from Examples 2 and 3, when similarly tested, gave similar results.

It will be understood that the details of procedure in the above examples may be varied within the skill of those engaged in this art. For instance, the proportions of the acidic and basic dye components are not critical. These may vary over a wide range inasmuch as either component, if used in excess remains in solution and is washed away in the filtrate.

The order of addition may also be varied, e.g. acid dye to basic dye solution or vice versa. The separate dye components, however, should preferably be in complete solution prior to salt formation in order to insure the best results.

It will be clear that our invention provides a simple and economical method for producing ball-pen inks of high quality, satisfying in particular the requirements of strong color, light fastness, fastness to crocking, stability of the ink cartridge as the pen ages, and other established requirements of ball-pen inks.

This application is a continuation-in-part of our application Serial No. 609,061, filed September 11, 1956, and abandoned December 11, 1958.

We claim as our invention:

1. A composition of matter useful as coloring matter in ball-pen inks, comprising the salt of a polysulfonated phthalocyanine compound and Victoria Pure Blue BO, said polysulfonated phthalocyanine compound being a phthalocyanine compound containing on the average from 2 to 4 sulfo groups per molecule and whose phthalocyanine nucleus is a member selected from the group consisting of copper phthalocyanine, nickel phthalocyanine, cobalt phthalocyanine, halogenated derivatives of these three compounds containing per molecule not more than one atom of a halogen from the group consisting of chlorine and bromine, copper-tetraamino phthalocyanine and metal-free phthalocyanine.

2. A coloring compound having the formula $$CuPc(SO_3Vi)_x$$

wherein CuPc designates a molecule of copper phthalocyanine, Vi designates the cationic radical of tetraethyldiaminodiphenyl - alpha - ethylaminonaphthyl methane, while $x$ is an average number having a value not less than 2 and not more than 4.

References Cited in the file of this patent

UNITED STATES PATENTS

| | | |
|---|---|---|
| 2,187,816 | Hartman | Jan. 23, 1940 |
| 2,493,724 | Mayhew | Jan. 3, 1950 |
| 2,528,390 | Sayler | Oct. 3, 1950 |
| 2,560,881 | Mayhew | July 17, 1951 |